United States Patent [19]

Sluimer

[11] Patent Number: 5,094,859
[45] Date of Patent: Mar. 10, 1992

[54] METHOD OF PREPARING FROZEN PIECES OF BREAD DOUGH AND OF PREPARING BREAD PRODUCTS

[75] Inventor: Pieter Sluimer, Renkum, Netherlands

[73] Assignee: Ahold Retail Services A.G., Zug, Switzerland

[21] Appl. No.: 482,281

[22] Filed: Feb. 20, 1990

[30] Foreign Application Priority Data

Feb. 22, 1989 [NL] Netherlands .......................... 8900436

[51] Int. Cl.⁵ .............................................. A21D 2/00
[52] U.S. Cl. ........................................ 426/19; 426/62; 426/486; 426/512; 426/523; 426/524; 426/549
[58] Field of Search ................... 426/19, 62, 523, 524, 426/549, 512, 486

[56] References Cited

U.S. PATENT DOCUMENTS

| | | |
|---|---|---|
| 4,369,193 | 1/1983 | Collins et al. .......................... 426/19 |
| 4,372,982 | 2/1983 | Haasl et al. . | |
| 4,374,151 | 2/1983 | Lindstrom et al. ..................... 426/19 |
| 4,407,827 | 10/1983 | Tanaka et al. .......................... 426/19 |
| 4,847,104 | 7/1989 | Benjamin et al. ...................... 426/19 |

FOREIGN PATENT DOCUMENTS

| | | |
|---|---|---|
| 0114450 | 8/1984 | European Pat. Off. . |
| 0115108 | 8/1984 | European Pat. Off. . |
| 0145367 | 6/1985 | European Pat. Off. .............. 426/19 |
| 0194189 | 9/1986 | European Pat. Off. . |
| 0311240 | 4/1989 | European Pat. Off. . |
| 2344229 | 10/1977 | France . |
| 2589043 | 4/1987 | France . |

OTHER PUBLICATIONS

Proceedings, 56th Meeting, American Society Baking Engineers (ASBE), pp. 38-43 (1980) BOYD, "Manufacture and Processing of Frozen Dough".

*Primary Examiner*—R. B. Penland
*Attorney, Agent, or Firm*—Pennie & Edmonds

[57] ABSTRACT

A method of preparing frozen pieces of bread dough, in which dough is kneaded and subsequently entirely shaped and proofed doughpieces are prepared and frozen. The pieces of bread dough can be stored in a freezer for some time and subsequently placed from the freezer, without defrosting step, in an oven and be baked off. The dough is kneaded at a high intensity. In a different embodiment, alcohol is added to the dough.

12 Claims, 1 Drawing Sheet

METHOD OF PREPARING FROZEN PIECES OF BREAD DOUGH AND OF PREPARING BREAD PRODUCTS

This invention relates to a method of preparing frozen pieces of bread dough. The invention also relates to a method of preparing bread products.

The bread preparation for bread in which yeast is used as a proofing agent, comprises substantially the following steps. First, the dough is kneaded, after which the so-called preproofing and preshaping take place. Subsequently, the so-called intermediate proofing step and the definitive shaping take place. Finally, the final proofing or pan proofing takes place and then the entirely raised and shaped dough is baked. The end product is a bread product.

The total process takes quite a long time, depending on the ingredients used, local tradition and the like, which in certain cases may be as long as about six hours. The process cannot be interrupted in principle, since the action of the yeast, i.e. the proofing process, continues.

Owing to the long duration of this process and the demand for fresh bread in the morning hours, bread preparation mostly takes place during the night, which is felt as a drawback. Besides, variations in demand cannot be coped with. Therefore, a possibility to interrupt the bread preparation process has been looked for. The process can then take place, at least partly, at a more convenient point of time and, if desired, in a different place.

It is known to cool the dough after shaping and prior to the final proofing, to e.g. −12° C. The proofing process is then interrupted and can be resumed one or some days later.

It is further known to freeze a definitively shaped doughpiece prior to the final proofing. Such a frozen doughpiece can be further processed until about 3 months later. To that effect, the doughpiece is first defrosted at 0° C., which may take from one to ten hours, depending on the weight. Thereafter the final proofing takes place at normal temperature for 1 to 1½ hours and finally, the doughpiece is baked. Accordingly, this so-called bake-off process takes much time, so that a similar drawback is encountered as in the non-interrupted bread preparation process.

EP-A-0,115,108 (General Foods Corporation) discloses a method of freezing an entirely proofed, shaped and finally proofed doughpiece. The frozen doughpiece, according to the known method, can be placed directly from the freezer in an oven to be baked off. To obtain a good quality of the end product, however, it is necessary according to this known technique, to use flour having a protein content of 16% or higher. Such a protein-rich flour, however, is difficult to obtain and expensive.

EP-A-0,145,367 (General Foods Corporation) discloses a method of preparing entirely proofed pastry dough, enabling to freeze doughpieces formed therefrom and, after a given storage period, to place these directly from the freezer in an oven to be baked. Defrosting and final proofing are not necessary according to EP-A-0,145,367 when flour having a protein content lower than 16% is used, the dough is kneaded at a low intensity and the doughpieces ar frozen slowly. However, such a pastry dough is unsuitable for preparing bread products, and so is the method described.

EP-A-0,114,450 (General Foods Corporation) describes a method of preparing entirely proofed, frozen doughpieces from bread dough, which doughpieces can be baked off in an oven directly from the freezer, without intermediate defrosting step. To obtain an end product of good quality according to this known technique, it is necessary that gum, surfactants and ingredients that can form a protein film are added to the dough.

EP-A-1,094,189 (Grands Moulins de Pantin) describes a method of preparing French bread, in which frozen doughpieces are prepared that can be placed directly from the freezer in an oven to be baked off. The technique described, according to which the doughpieces should rise at low temperature (about 0° C.) for a prolonged period (about 48 hours) and subsequently be frozen at −50° C., requires much time and is difficult to realize in actual practice. Furthermore, no final proofing takes place according to this known method.

FR-A-2,344,229 (Bourdon) describes a method of preparing products from puff pastry dough, in which a flour is used that is rich in gluten. The pieces formed from the puff pastry dough are caused to rise, but the proofing process is discontinued abruptly half-wa by freezing the doughpieces quickly.

It appears from the above cited literature that it has been tried in the past in various manners to develop methods for both bread products and other dough products, according to which a frozen doughpiece can be prepared that has a long storage and shelf life in frozen condition and which can be baked off directly from the freezer without intermediate defrosting step.

A drawback of the known methods is that in actual practice these are difficult to realize and/or time-consuming and/or expensive, while also the quality of the end product is not always optimal.

The present invention specifically relates to the preparation of bread products, and to frozen pieces of bread dough, and provides an improved effective method of preparing such bread products, and frozen pieces of bread dough, respectively. According to the invention, a method of preparing bread products, in which entirely shaped and proofed doughpieces are prepared and frozen, the frozen doughpieces are stored in a freezer for some time, and subsequently placed from the freezer, without defrosting step, in an oven and baked off is characterized in that the dough is kneaded at a relatively high intensity. According to a further elboration of the invention, alcohol can be added to the dough.

The present invention will now be described, by way of example, with reference to the accompanying drawings, in which.

Figure 1:
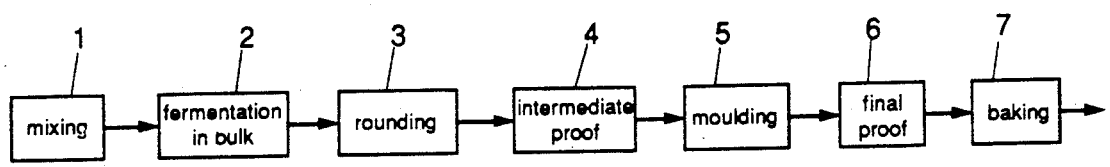
FIG. 1 is a flow sheet illustrating a known bread preparation process without interrupted proofing.

FIG. 1 is a flow sheet showing a normal bread preparation process without interruption. At 1 the dough, made from the desired ingredients and containing yeast, is kneaded. At 2 pre-proofing takes place, at 3 preshaping, at 4 intermediate proofing and at 5 shaping. During shaping, the doughpieces are brought into the final shape, with or without the use of pans. At 6 the final proofing or pan proofing takes place and at 7 the bread product is baked.

Figure 2:
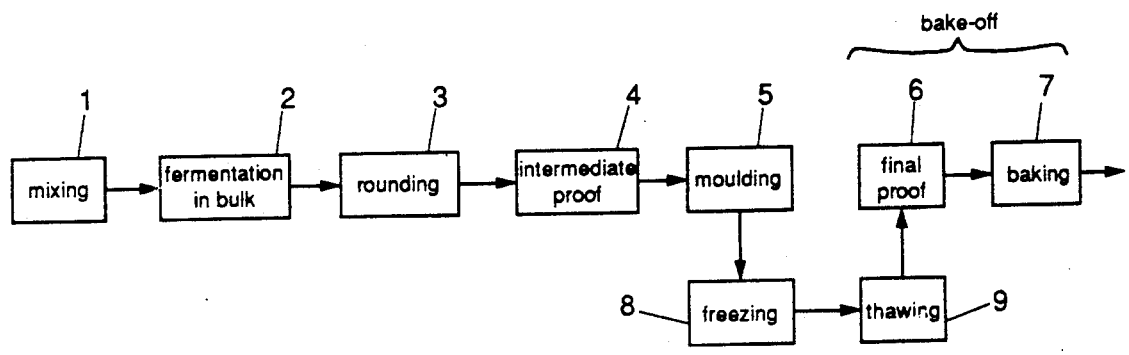
FIG. 2 is a flow sheet illustrating a known bread preparation process with interrupted proofing.

According to the method illustrated in FIG. 2, the process is interrupted after shaping (step 5), because the doughpieces formed are cooled to a temperature substantially below 0° C., e.g. by freezing. The freezing step is shown diagrammatically in FIG. 2 with a block 8 and the defrosting step with a block 9.

A process in which, prior to the final proofing step, the doughpieces are frozen for them to be baked later, mostly in a different place, is called a bake-off process. An additional advantage of the bake-off process is that the bread can be baked in the shop itself, which is attractive for the consumer. However, a drawback is the long duration of the bake-off process, including defrosting, so that accurate planning is required and bread cannot be baked in the shop without more ado at any point of time of the day. In that case too, no allowance can be made, in fact, for short-term variations in the demand for bread products. Moreover, the known bake-off process necessitates a defrosting cell in which a temperature of 0° C. prevails. Quicker defrosting results in an inferior dough structure and also has an adverse effect on the yeast cells.

Figure 3:
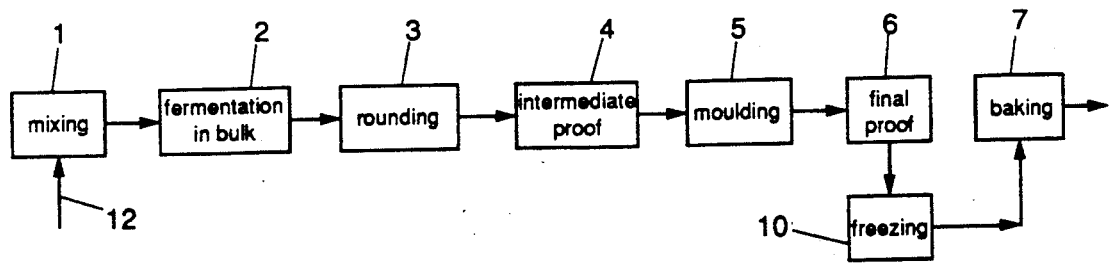
FIG. 3 is a flow sheet illustrating a method according to the present invention.

According to the present invention, the bread product preparation is interrupted, not after shaping, but after the final proofing step by freezing the afterproofed doughpieces, as illustrated in FIG. 3 at 10. It has been established experimentally that doughpieces thus frozen can be baked off directly in a preheated or non-preheated oven and that nevertheless a good product can be obtained. Consequently, prior (slow) defrosting is not necessary and the final proofing has already been accomplished before the freezing step. A defrosting cell can be dispensed with as well. As a result, bake-off can take place at any desired moment and hence can be effected in the supermarket, but also in the consumer's home without any problems.

According to a further elaboration of the present invention, at least for certain types of bread products, the quality of the end product is further enhanced by imparting to the dough an excess of baking value, which as used herein means the capacity of a flour or meal to produce good-quality dough in terms of the way in which the meal reacts to the baking process.

A first possibility therefor is the use of a much better flour quality than conventional. The flour may be of rusk quality and, if desired, may have been fortified with wheat gluten flour.

Furthermore, preferably a high kneading intensity is used which is in the order of 160% or more of the normal kneading intensity. The temperature rise of the raw materials, i.e. the dough ingredients, is then about 10° C. or more.

According to experiments, a good end result is enhanced by adding alcohol during the dough preparation, as indicated with an arrow 12 in FIG. 3. Alcohol of a purity of 98% can be added during the kneading step, e.g. in a quantity in the order of 1 to 5%, preferably 2% of the weight of the flour used for the preparation of the dough.

Another measure preferably taken is extreme degassing during the shaping phase. As a result, a finer distribution of carbon dioxide gas in the dough is obtained.

Degassing ma be effected e.g. by rolling out the dough to thin slices, e.g. thinner than normal by a factor of two. Alternatively, during the kneading step, gas inclusions could be avoided by kneading in a partial vacuum.

By using an adapted yeast strain, a good end result can be promoted. Suitable yeast strains are those used in the bake-off process for use in deep-freeze dough.

Moreover, a high yeast percentage is preferably used, e.g. in the order of 6-10% of the flour weight, instead of the normally employed percentage of about 2%. In that case, preferably a relatively low dough temperature is used, e.g., in the range of 16°-24° C., but preferably between 18° and 22° C.

For certain products, such as a big loaf, the dough can be frozen in a pan wherein the product can be directly baked later.

Freezing is effected at a relatively high temperature. In general, foodstuffs should be frozen as quickly as possible, To that end, mostly the freezing temperature is $-80°$ C. Dough does not allow this, inasmuch as it would destroy the yeast cells present at or near the exterior of the doughpieces. Therefore, in the process according to the present invention, the dough is frozen at the relatively high temperature of e.g. about $-30°$ to $-40°$ C. It is has been established experimentally that at a still higher freezing temperature, of e.g. about $-12°$ to $-18°$ C., the keeping qualities of the frozen product are increased.

When one or more lengths of wet string are placed over the frozen doughpieces, and the doughpieces are subsequently baked off in an oven, this has a favourable effect on the course of the baking process, while at the same time the bread obtains an attractive appearance. At the location of the strings, crust formation during the baking process is retarded. As a result, steam developed in the bread during the baking process can escape at the location of the strings.

It is observed that in view of the above, various modifications will readily occur to those skilled in the art. For instance, the above described additional steps for improving the quality of the product can be used each separately or in combination with any or all of the other features described. It is also possible sometimes to employ certain steps to a lesser degree than indicated, without this resulting in an end product of insufficient quality. Besides, compensation of one step by another is possible. It is for instance conceivable to use a yeast percentage of 5-7% without a higher kneading intensity than indicated. Also, a lower yeast percentage than indicated can be compensated by using for instance a special yeast strain.

Similarly, a kneading intensity slightly lower than e.g. 160% of the conventional kneading intensity might be compensated by a higher yeast percentage.

These and similar modifications are deemed to fall within the scope of the present invention.

I claim:

1. In a method of preparing frozen pieces of bread dough, in which the dough ingredients are kneaded, and subsequently fully shaped to a shaped desired before baking and fully proofed doughpieces are prepared and frozen, which pieces of bread dough can be stored in a freezer and subsequently removed from the freezer, placed in an oven without a defrosting step and be baked off, the improvement which comprises kneading the dough ingredients at a high intensity and increasing the temperature of the dough ingredients during kneading by more than 10° C.

2. The method as claimed in claim 1, wherein alcohol is added to the dough during kneading, said alcohol having a purity of 98% and being added in a quantity of about 2% of the weigh of the quantity of flour used for the preparation of the dough.

3. The method as claimed in claim 1, wherein as the doughpieces are shaped, the dough is degassed by rolling out the dough to thin slices.

4. The method as claimed in claim 1, wherein a yeast percentage of between about 6 and 10% calculated on the flour weight is used.

5. The method as claimed in claim 1, wherein flour fortified with wheat gluten flour is used.

6. In a method of preparing pieces of frozen bread dough in which dough is kneaded, and subsequently fully shaped to a shape desired before baking, and fully proofed doughpieces are prepared and frozen, which doughpieces can be stored in a freezer and then be removed from the freezer, placed in an oven without a defrosting step and backed off, the improvement which comprises adding alcohol during kneading, said alcohol having a purity of 98% and being added in a quantity of about 2% of the weight of the quantity of flour used for the preparation of the dough.

7. The method as claimed in claim 6, wherein high-quality flour is sued for the preparation of the doughpieces and the dough is degassed as the doughpieces are being shaped.

8. The method as claimed in claim 7, wherein a high yeast percentage is used.

9. In method of preparing baked bread products from frozen pieces of bread dough in which the dough ingredients are kneaded, and subsequently fully shaped and fully proofed doughpieces are prepared and frozen, which pieces of bread dough can be stored in a freezer and subsequently removed from the freezer, placed in an oven, without a defrosting step, and be baked off, the improvement which comprises kneading the dough at a high intensity, freezing the bread doughpieces in a freezer after they have been fully proofed, subsequently removing one or more of the bread doughpieces from the freezer and placing the frozen doughpieces directly into an oven and without defrosting baking the bread doughpieces to produce said baked bread products.

10. The method as claimed in claim 9, wherein a length of wet string is placed over the frozen doughpiece in one or more places before the frozen doughpiece is placed in the oven.

11. In a method of preparing baked bread products from pieces of frozen bread dough, in which dough is kneaded, and subsequently fully shaped to a shape desired before baking, and fully proofed doughpieces are prepared and frozen, which doughpieces can be stored in a freezer and then be removed form the freezer, placed in an oven without a defrosting step and baked off, the improvement which comprises adding alcohol during kneading, said alcohol having a purity of 98% and being added in a quantity of about 2% of the weight of the quantity of flour used for the preparation of the dough, placing one or more of the frozen doughpieces directly into an oven and without defrosting baking the bread doughpieces to produce said baked bread products.

12. The method as claimed in claim 11, wherein a length of wet string is placed over the frozen doughpiece in one or more places before the frozen doughpiece is placed in the oven.

* * * * *